United States Patent [19]
Stokes

[11] Patent Number: 5,901,890
[45] Date of Patent: *May 11, 1999

[54] SCUBA GEAR RACK FOR WATERCRAFT

[76] Inventor: Donald R. Stokes, P.O. Box 142233, Pittsburgh, Pa. 15239

[ * ] Notice: This patent is subject to a terminal disclaimer.

[21] Appl. No.: 08/943,264

[22] Filed: Oct. 3, 1997

Related U.S. Application Data

[63] Continuation-in-part of application No. 08/602,368, Feb. 16, 1996, Pat. No. 5,673,507.

[51] Int. Cl.⁶ .............................. B63B 17/00; B60R 9/00
[52] U.S. Cl. ......................... 224/406; 224/551; 224/556; 224/558; 224/568; 114/343; 114/364
[58] Field of Search ..................... 224/400, 403, 224/405, 406, 309, 320, 321, 324, 545, 550, 551, 555, 556, 557, 558, 567, 568; 248/512, 513, 538; 43/21.2; 114/343, 364

[56] References Cited

U.S. PATENT DOCUMENTS

| | | | |
|---|---|---|---|
| 2,720,414 | 10/1955 | Hart | 224/403 |
| 3,217,449 | 11/1965 | Levere | 224/403 |
| 3,805,722 | 4/1974 | Melchert, Jr. et al. | 114/364 |
| 3,925,836 | 12/1975 | Simmonds | 114/364 |
| 4,023,761 | 5/1977 | Molis | 248/313 |
| 4,211,448 | 7/1980 | Weston | 224/403 |
| 4,901,469 | 2/1990 | Murray | 43/21.2 |
| 5,123,371 | 6/1992 | Giordano et al. | 114/364 |
| 5,390,886 | 2/1995 | Lawner | 248/231 |
| 5,454,342 | 10/1995 | Colquett et al. | 114/364 |
| 5,673,507 | 10/1997 | Stokes | 114/364 |

*Primary Examiner*—Gregory M. Vidovich
*Attorney, Agent, or Firm*—Robert M. Downey, P.A.

[57] ABSTRACT

A support rack for use on a watercraft to hold several scuba gear and other equipment such as dive tanks, lights, radar, spear guns and a dive flag, the rack including oppositely disposed base members and a bridge structure including opposite vertical portions each attached to and extending upward from a corresponding one of the base members, and a horizontally extending portion integral with upper end zones of the vertical portions. The opposite base members removably mount to the watercraft to support the bridge structure above the stern or gunwale. Mounting structures are provided on the base members and bridge structure for holding the gear on the rack.

4 Claims, 5 Drawing Sheets

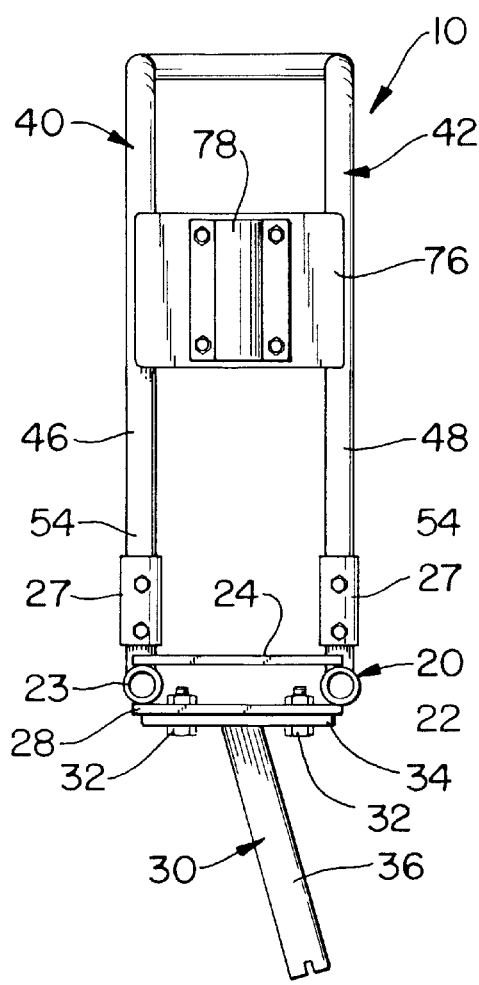
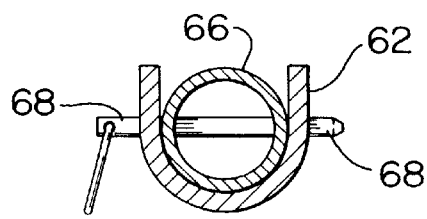
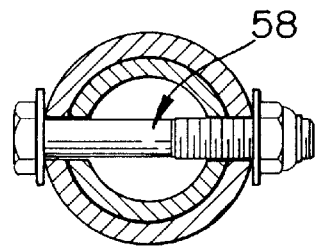
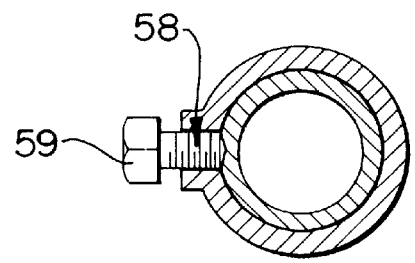
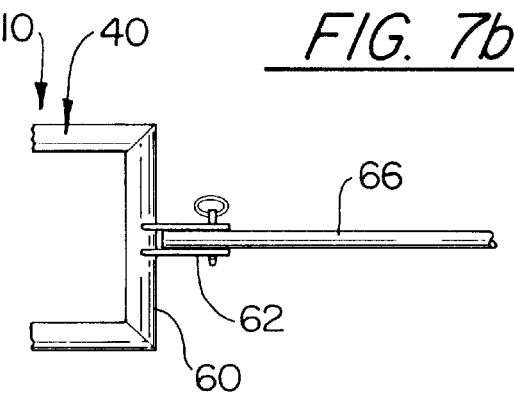

SCUBA GEAR RACK FOR WATERCRAFT

BACKGROUND OF THE INVENTION

This application is a continuation-in-part of U.S. patent application Ser. No. 06/602,368 filed Feb. 16, 1996 which has matured into U.S. Pat. No. 5,673,507.

FIELD OF THE INVENTION

The present invention relates to a rack for installation on watercraft, and more particularly, to a rack which removably mounts to a watercraft for holding scuba gear and various equipment in a convenient, secured and accessible arrangement.

DISCUSSION OF THE RELATED ART

It is often necessary to carry various articles of equipment on a watercraft such as a rigid hull powerboat or an inflatable boat. In particular, articles of scuba gear, including dive tanks, spear guns, lights, fins, regulators and the like are commonly transported on watercraft when traveling to and from a diving site. All of this equipment can take up considerable space and, on a small boat wherein storage space is limited, safely stowing scuba gear can present a real problem. The dive tanks, in particular, need to be secured so that they don't roll around and injure occupants or damage the boat. And, because dive tanks contain highly pressurized air, there is always a fear that the tanks could explode. In light of these and other concerns, dive tanks are typically secured on the deck of a boat, using straps, line or storage boots which hold the tanks in an upright position. These commonly used stowing techniques work to secure dive tanks and other gear on watercraft. However, because this equipment occupies a good deal of deck space, stowing it in this manner is usually at the expense of the mobility of the passengers. Furthermore, securing the tanks and other equipment is time-consuming and inefficient, especially when travelling to several dive sites during the same trip.

When anchored at the dive site, it is necessary to display a dive flag in a highly visible, prominent manner. Unfortunately, most small boats do not have means for accommodating display of dive flags in the effective viewing position. It may also be desirous to have navigation equipment, such as lights, radar, horns and the like, installed on a watercraft. But, as mentioned above, boats usually do not have means, such as superstructure, to accommodate mounting of such equipment.

Accordingly, there is still a need in the boating industry for a support structure which is adapted to hold dive gear and other equipment in a secured, operative and efficient manner on a watercraft and which does not interfere with the mobility of passengers or operation of the watercraft.

SUMMARY OF THE INVENTION

The present invention is directed to a rack which is specifically structured for use on a watercraft to hold various equipment, including articles of scuba gear, radar equipment, flags and the like in a secured, easily accessible manner which does not clutter space or restrict movement about the watercraft.

The rack includes oppositely disposed base members attached to a bridge structure. The bridge structure consists of opposite vertical portions each attached to a corresponding one of the base members and a horizontally extending portion integral with the upper end zones of the vertical portions. An extension member may be provided which interconnects along the horizontally extending portion to vary separation of the base members and attached vertical portions, thereby providing for adjustment of the overall length of the bridge structure. The opposite base members removably mount to the watercraft to support the bridge structure either above the watercraft's stern, above the port starboard gunwale, or transversely between the port and starboard gunwales. Means to adjust the height of the horizontally extending portion relative to the base members is further provided so that a sufficient clearance is maintained between the bridge structure and outboard engines or other objects on the stern of the watercraft. Means for holding the various equipment on the rack, including braces, brackets, straps and the like are provided on the base members and the bridge structure.

With the foregoing in mind, it is a primary object of the present invention to provide a rack which is adapted for removable mounting on a watercraft to support a plurality of articles, such as dive tanks, lights, radar equipment, spear guns and flags in an operable, secured, and highly efficient arrangement which does not interfere with the ability of occupants to move about the watercraft.

It is a further object of the present invention to provide a rack, as set forth above, which is structured to hold and support a plurality of dive tanks in an upright, safe, easily accessible and secured arrangement.

It is still a further object of the present invention to provide a support rack for supporting a plurality of articles of scuba gear and other equipment thereon and which is manufactured entirely of non-corrosive materials.

It is yet a further object of the present invention to provide a support rack, as set forth above, which is structured for removable mounting to a watercraft, wherein the rack can be removed and stowed on the watercraft when not in use.

It is yet a further object of the present invention to provide a support rack, as set forth above, which is specifically structured for easy, removable installation on inflatable or fixed transom boats or on conventional rigid hull boats.

It is still a further object of the present invention to provide a rack, as set forth above, which can be partially disassembled to facilitate stowing of the apparatus on a watercraft.

These and other objects and advantages will be more readily apparent in the description which follows.

BRIEF DESCRIPTION OF THE DRAWINGS

For a fuller understanding of the nature of the present invention, reference should be had to the following detailed description taken in connection with the accompanying drawings in which:

FIG. 4 is a side elevational view of the embodiment of FIG. 2;

FIG. 5 is a partial isolated top plan view of one side of the support apparatus;

FIG. 6 is a sectional view taken along the line 6—6 of FIG. 2;

FIG. 7A is a sectional view taken along the line 7A—7A of FIG. 2;

FIG. 7B is a sectional view of an alternative embodiment of the attachment assembly of FIG. 7A;

Like reference numerals refer to like parts throughout the several views of the drawings.

DETAILED DESCRIPTION OF THE PREFERRED EMBODIMENT

Referring to the several views of the drawings, there is illustrated various embodiments of the scuba gear rack of the present invention, generally indicated as 10 throughout the drawings.

Figure 2:
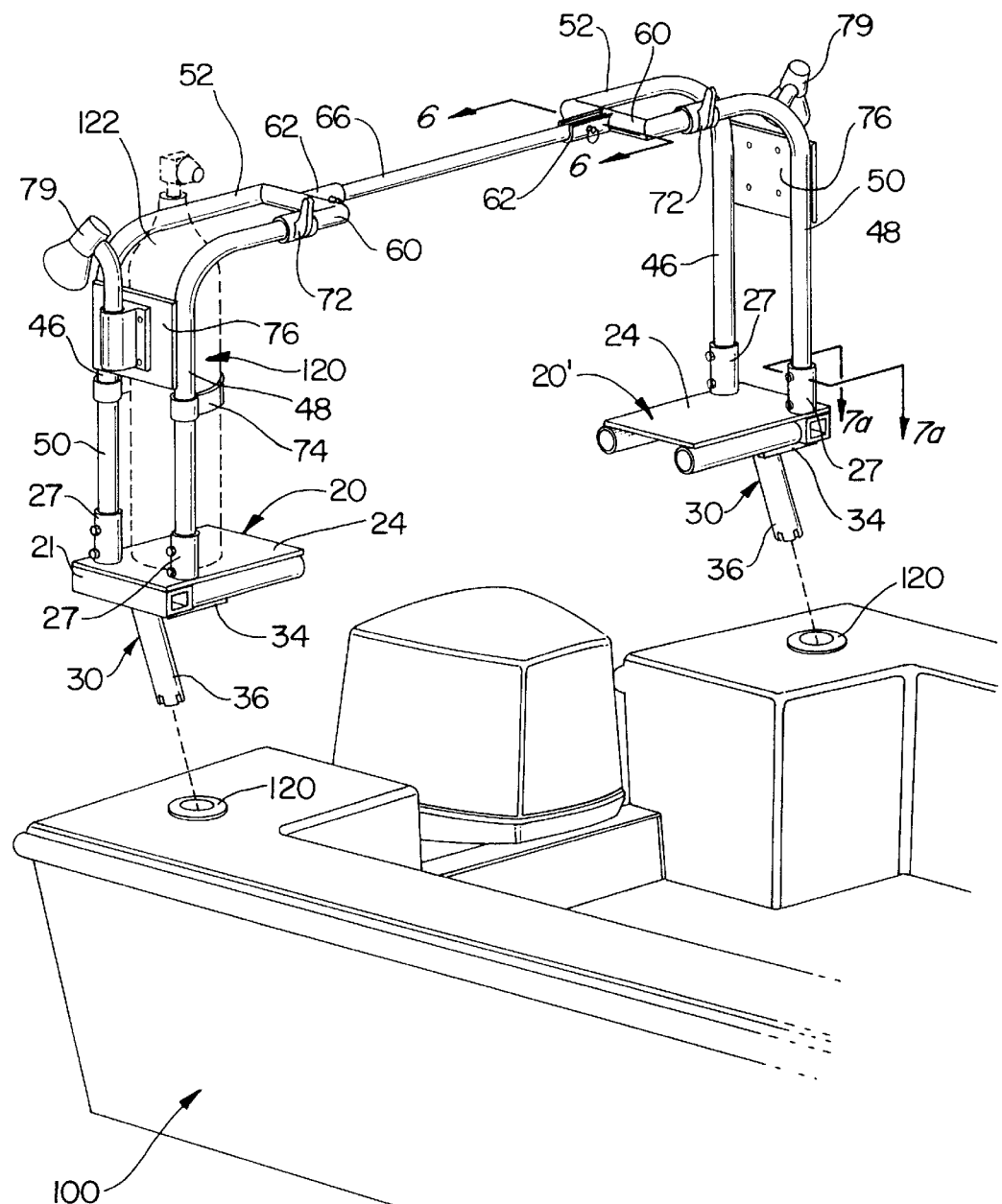
FIG. 2 is an isolated perspective view of another preferred embodiment of the present invention, illustrating mounting of the rack within fishing rod holders on a rigid hull boat using universal gimbals attached to the base members of the apparatus.

With initial reference to FIGS. 2 and 4, one preferred embodiment of the rack is shown. The rack 10 of this embodiment includes opposite base members 20, 20' positioned and disposed in spaced, opposite relation to one another. The base members each include a pair of parallel, horizontal bars 22, 23 secured to an end plate 24 which is welded to the parallel bars 22, 23 to define an integral unit. The bases 20 further include a transverse member 21 ( it is noted that this member is removed in FIG. 4 to clarify the structural connections). A pair of short, hollow vertical extensions 27 are welded to and extend upwardly from each of the horizontal bars 22, 23 of each base member 20, 20'.

A bottom plate 28 is centered and welded to a bottom of the parallel, horizontal bars 22, 23 of each base member 20, as seen in FIG. 4, 20' to facilitate mounting of a universal gimbal 30 thereto using conventional fasteners 32, such as aluminum or stainless steel screws or bolts. The universal gimbal 30 includes a mounting plate 34 which attaches to the under side of bottom plate 28 using the fasteners 32, and an angled mount extension arm 36 specifically sized, configured and oriented for sliding receipt within the corresponding rod holder 1 20 on the port or starboard side of the boat's stern.

The rack 10 further includes a bridge structure 40 including left and right sections 42, 42' each adapted for fixed, adjustable attachment to a respective, corresponding one of the base members 20, 20'. The left and right sections 42, 42' are primarily defined by parallel pipes 46, 48 which are bent to define vertical portions 50 and horizontal portions 52. The vertical portions of each of the pipes of the respective left and right bridge sections each include a lower end zone 54 adapted for telescopic, adjustable receipt within a corresponding one of the hollow vertical extensions 27 on the base members 20, 20'. Alternatively, a tubular extension adaptor can be used to telescopically receive the lower end zone 54 through one end and the vertical extension 27 through an opposite end. The extension adaptor is simply a straight extension of hollow pipe which has a larger inner diameter than the outer diameters of the lower end zone 54 and vertical extension 27. Means are provided on the opposite ends of the extension adaptor for adjustable, locking engagement with the lower end zone 54 and the vertical extension 27. The lower end zones 54, once fitted and selectively positioned within the vertical hollow extensions 27 or extension adaptor, are secured therein using any of a desired number of attachment means 58 such as those shown in FIGS. 7A and 7B. In FIG. 7A, a through bolt is shown which extends through correspondingly aligned apertures formed in the lower end zone of the vertical extensions and the hollow vertical sockets on the base members. Alternatively, a set screw 59 can be used which threads through a threaded aperture formed in the sides of the hollow vertical extensions 27 for engagement against the lower end zones of the respective lower end zones 54 of the vertical extensions of the bridge sections, as seen in FIG. 7B. Selective positioning of the lower end zones within the hollow extensions 27 or extension adaptor enables for varying the overall height of the bridge structure 40.

The horizontal extensions of each of the left and right bridge sections 42, 42' are structured and configured in a generally Y-shaped member 60 having a central, horizontally extending channel 62 adapted for adjustable, fitted receipt of an extension cross bar 66 to effectively interconnect the left and right bridge sections 42, 42'. Attachment of the extension cross bar 66 within the respective channels 62 of the Y-shaped member 60 is shown in FIG. 6, wherein a pin 68 is inserted through aligned apertures on the channel 62 and the cross bar 66 respectively. By selectively positioning the cross bar within each of the opposite channels on the sections 42, 42', the overall length of the rack 10 can be selectively adjusted, thereby accommodating for various distances of separation between the rod holders 120 on different boat models.

Side plates 76 are provided on each of the left and right bridge sections 42, 42' and are welded to the parallel, vertically extending bars. A fitting such as 78 can be attached to these plates 76 to hold and support a light 79 or other device, as seen in FIGS. 1, 2 and 4.

Means are provided on each of the bridge sections 42, 42' to support one or more dive tanks 120 in an upright position. In particular, the plate 24 on each of the base members 20, 20' are ideally suited for supporting the bottom of the dive tanks 120, so that the dive tanks can stand upright on the plate 24. Further, the parallel pipes 46, 48 on the horizontal portion 52 are spaced sufficiently apart to receive the upper portion 122 of the dive tanks 120 therebetween in a manner which significantly restricts movement of the tanks. In order to facilitate placement and removal of the tanks from the stowed, upright position between the parallel pipes 46, 48, a fitting 72 may be provided for detaching one of the pipes 46, 48 from the Y-shaped member 60, as seen in FIGS. 1 and 2, thereby permitting the pipe to be rotated relative to a remainder of the bridge section, providing an opening in the horizontal portion 52 between the plate 76 and the fitting 72. This opening is sufficient to accommodate passage of the tanks 120 therethrough, while remaining in the upright position. Alternatively, the tanks can be mounted in the upright position by tilting them and moving the upper portion of the tanks 122 between the parallel pipes 46, 48. Straps 74 may further be provided to secure the tanks 120 in the upright, stowed position. Further, U-shaped brace members 75 may be fitted to the vertical portions 50, opposite the plates 76, to stabilize the dive tanks 120 and maintain them in the upright position. Specifically, a dive tank is received within the U-shaped structure of the brace so that opposite arms 77, 77' of the brace 75 hold the tank upright, preventing the tank 120 from tipping over to either side. Further, a fitting 78 may be provided on the pipes horizontal portions 52 for supporting a dive flag in a highly visible, prominent manner. The horizontal portions 52, including the cross bar 66, may further be used to mount equipment such as radar equipment, spotlights, horns, and the like.

Figure 1:
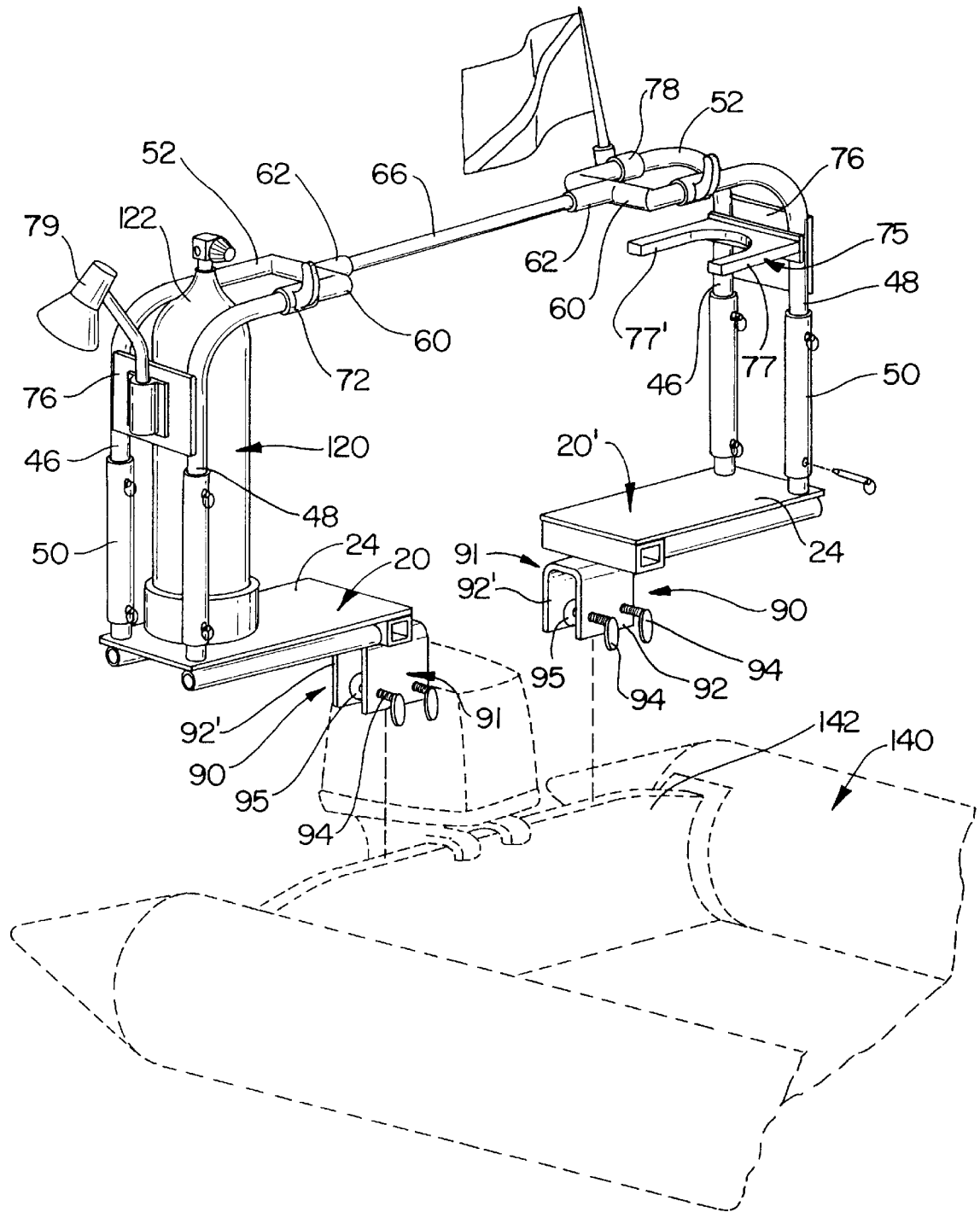
FIG. 1 is an isolated perspective view showing a preferred embodiment of the scuba gear rack of the present invention, illustrating mounting of the rack to a transom of an inflatable watercraft using mounting clamps.

FIG. 1 shows another preferred embodiment of the rack 10 which is very similar to the embodiment of FIG. 2 except that this particular embodiment, in FIG. 1, is adapted for mounting the base members 20, 20' of the rack 10 to the transom 142 of an inflatable watercraft 140. Specifically, the mounting assembly 90 includes clamps 91 fitted to the bottom of each base member 20, 20'. Each of the clamps 91 includes a pair of spaced plates 92, 92' which fit on opposite sides of the transom 142 so that the transom is sandwiched therebetween. Threaded members 94 with pressure plates 95 positioned between the plates 92, 92' are used to provide a tight fit of the clamps 91 on the transom 142. Specifically, the threaded members 94 are rotated to advance the pressure plates 95 towards the opposite plate 92, causing pressure to be exerted on the transom 142 positioned between the pressure plates 95 and the rear plates 92'.

Figure 3:
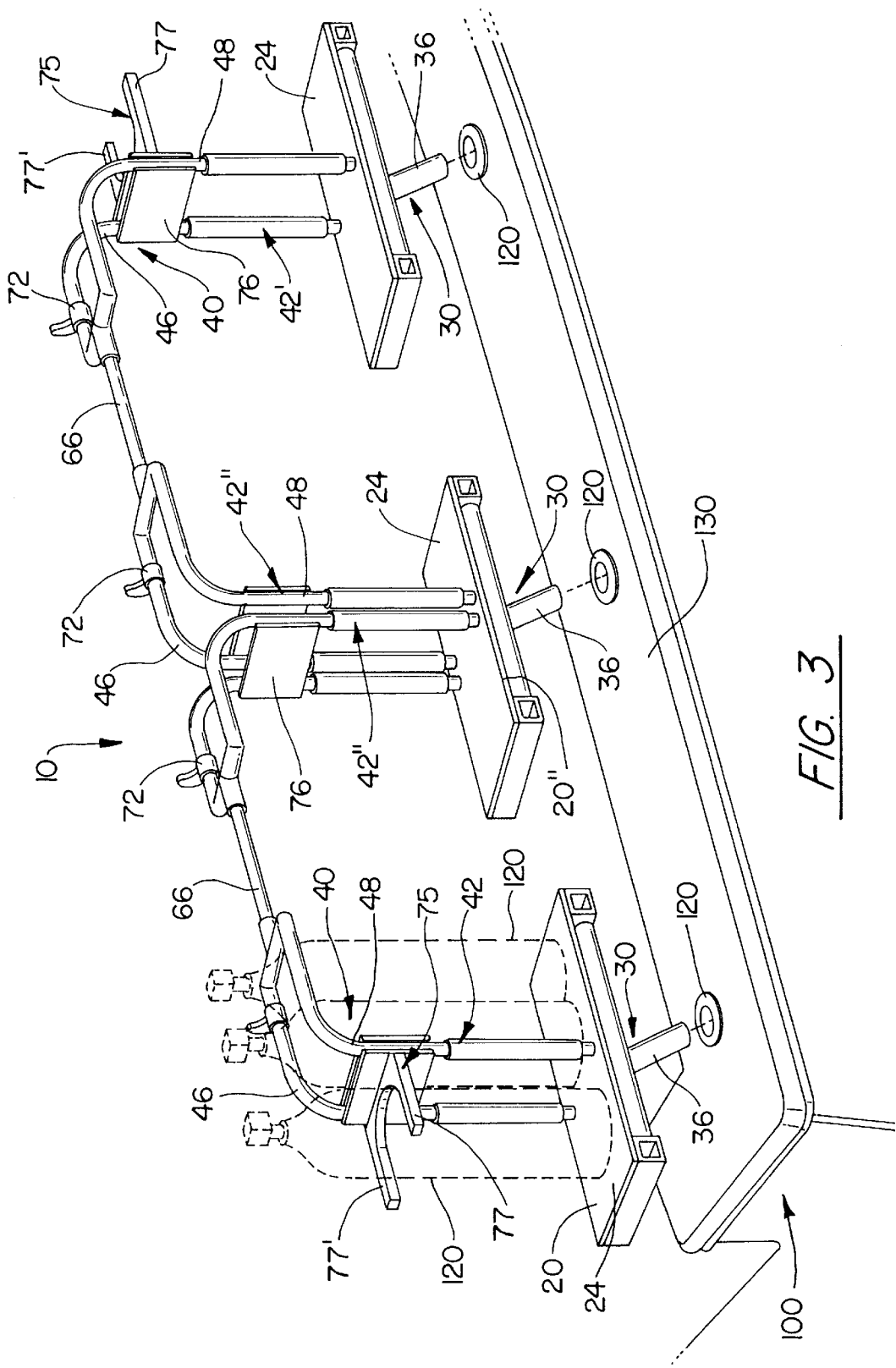
FIG. 3 is an isolated perspective view illustrating mounting of another embodiment of the rack within fishing rod holders along the gunwale of a rigid hull watercraft.

Referring to FIG. 3, an alternative embodiment of the embodiment of FIG. 2 is shown, wherein two bridge sections 42" are positioned back to back on a base member 20" for interconnection with bridge structures 40, thereby creating a double rack structure. This particular embodiment of the rack 10 is ideal for mounting along the port or starboard gunwale 130 of the watercraft 100. Extension arms 36 of the universal gimbals 30 are received within the fishing rod holders 120 in the top of the gunwale 130, in the same manner as described in connection with the embodiment of FIG. 2.

Figure 8:
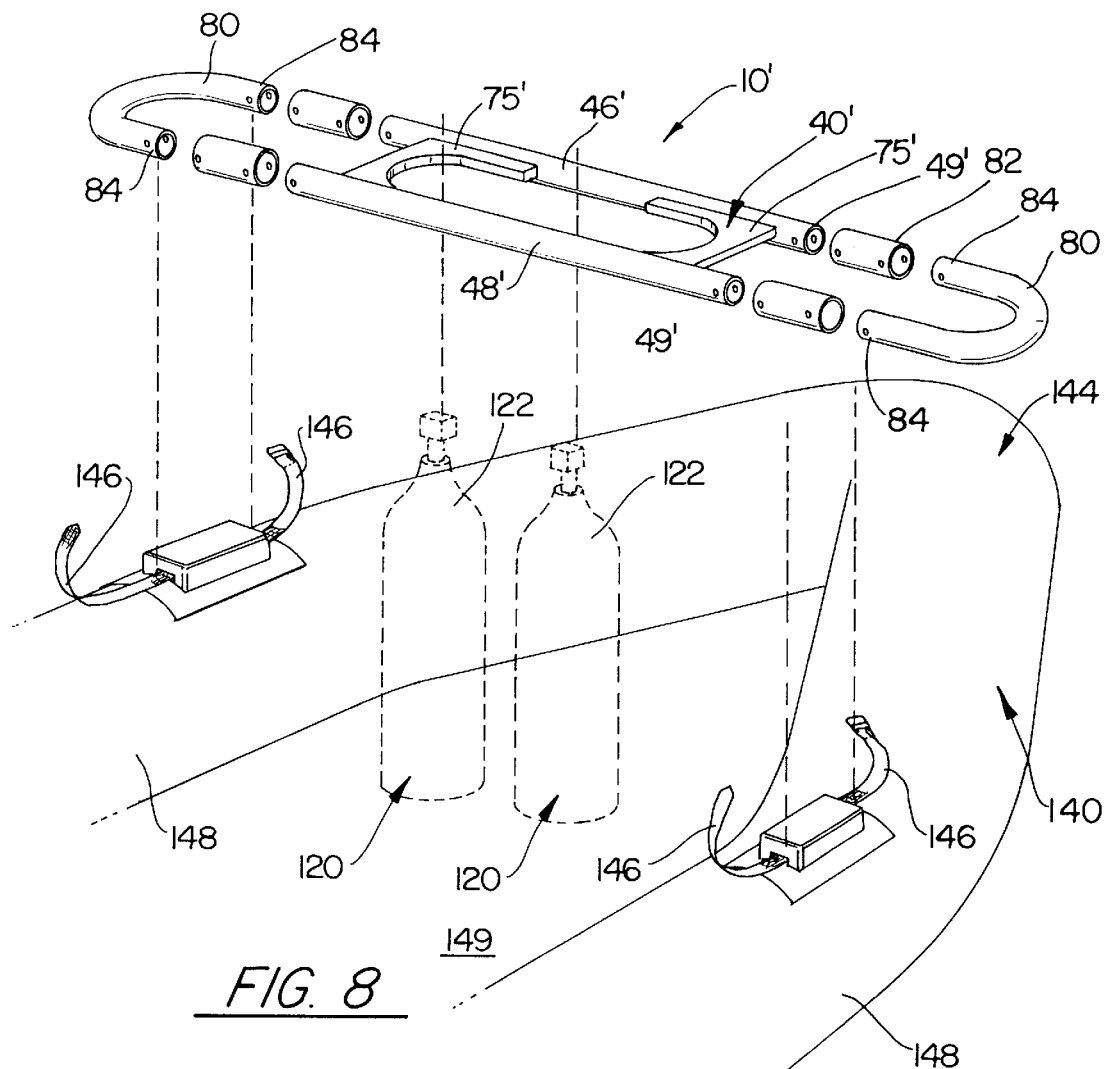
FIG. 8 is a partially exploded perspective view illustrating mounting of an alternative embodiment of the rack transversely across a forward area of an inflatable watercraft.
Figure 9:
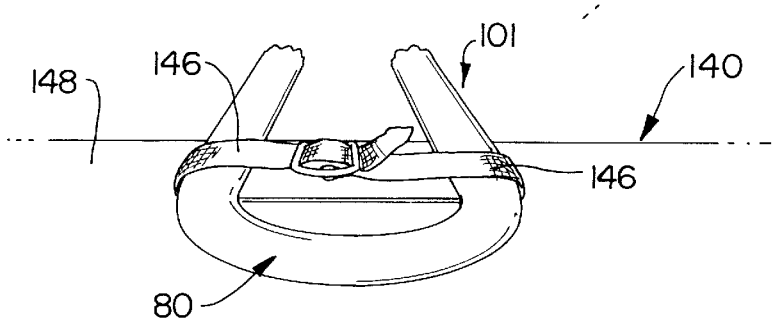
FIG. 9 is an isolated view illustrating mounting of the embodiment of FIG. 8 to the gunwale of the side tubes of an inflatable watercraft.

Another embodiment of the rack of the present invention is shown in FIGS. 8 and 9, wherein the rack is generally indicated as 10'. In particular, the rack 10' includes a central section 40' having parallel pipe sections 46', 48'. U-shaped members 80 are fitted to distal ends 49' of each of the pipe sections 46', 48'. As seen in FIG. 8, tube sections 82 may be used for interconnecting the U-shaped members 80 to the distal ends 49', wherein the tube sections 82 are of a larger or smaller diameter than the ends 49' and the ends 84 of the U-shaped members 80 for sliding, telescopic receipt of the ends 84 and 49' therewith.

As seen in FIG. 8, this particular embodiment of the rack 10' is adapted for mounting transversely across an inflatable watercraft 140. This might be particularly useful in order to provide more even weight distribution, wherein dive tanks 120 can be stowed towards a bow portion 144 of the watercraft to offset the weight of the engine at the transom as well as occupants sitting towards the rear of the watercraft. To facilitate mounting of the rack 10' to the watercraft 140, in this particular embodiment, straps 146 may be provided on the port and starboard tube sections 148 of the watercraft. The straps 146 are fastened about the U-shaped members 80, as seen in FIG. 9. Braces 75+ are provided between the parallel pipe sections 46', 48' to stabilize the tanks 120 received between the pipe sections 46', 48' when the rack 10' is mounted transversely to the watercraft 140. In this manner, an upper portion of the tanks 120 extends above the rack 10' so that the brace members 75' engage sides of the tanks 120 at a mid-zone thereof, maintaining the tanks 120 in an upright position with the bottom of the tanks resting on the deck 149 of the watercraft 140.

While the instant invention has been shown and described in what is considered to be preferred and practical embodiments thereof, it is recognized that departures may be made within the spirit and scope of the present invention which, therefore, should not be limited except within the spirit and scope of the invention as set forth in the following claims and within the doctrine of equivalents.

Now that the invention has been described,

What is claimed is:

1. For use on a watercraft having a mounting surface, a rack for holding a plurality of articles comprising:

first and second base members, each having a top side and a bottom side, a first bridge section having a lower end attachable to said top side of said first base member, and a second bridge section having a lower end attachable to said top side of said second base member, said first and second bridge sections each including a vertical portion extending upwardly from said respective lower ends, and a horizontal portion extending from said vertical portion and terminating at an upper end zone, adjustable extension means for selectively varying a distance between said first and second base members and being releasably attachable to said upper end zones of said first and second bridge sections, respectively, and extending horizontally therebetween, wherein said first and second bridge sections and said adjustable extension means define a bridge structure, securing means for removably securing said base members to the watercraft so that the bridge structure is supported above the mounting surface of the watercraft, and securing means on said rack for removably securing said plurality of articles thereon, said securing means including holding means attached to the vertically extending portion between said base member and said horizontal portion of at least one bridge section for holding a dive tank in an upright, secured orientation.

2. A rack as recited in claim 1 further including means for adjustable extension of said vertical portions of said first and second bridge sections to selectively vary the height of said bridge structure relative to said base members and the mounting surface of the watercraft.

3. For use on a watercraft having a mounting surface with rod holders in the mounting surface a rack for holding a plurality of articles comprising:

first and second base members, each having a top side and a bottom side, a first bridge section having a lower end attachable to said top side of said first base member, and a second bridge section having a lower end attachable to said top side of said second base member, said first and second bridge sections each including a vertical portion extending upwardly from said respective lower ends, and a horizontal portion extending from said vertical portion and terminating at an upper end zone, adjustable extension means for selectively varying a distance between said first and second base members and being releasably attachable to said upper end zones of said first and second bridge sections, respectively, and extending horizontally therebetween, wherein said first and second bridge sections and said adjustable extension means define a bridge structure, securing means for removably securing said base members to the watercraft so that the bridge structure is supported above the mounting surface of the watercraft, said securing means including a pair of universal gimbals each fixedly attached to the bottom side of a respective, corresponding one of said base members, said universal gimbals each including an extending arm portion adapted for sliding, removable receipt within the rod holders in the mounting surface, and securing means on said rack for removably mounting said plurality of articles thereon, said securing means including said top side on each of said base members to facilitate support of at least one dive tank thereon and plate members fixedly attached to said vertically extending portions having means thereon for holding light fixtures.

4. For use on a watercraft having a mounting surface and a transom, a rack for holding a plurality of articles comprising:

first and second base members, each having a top side and a bottom side, a first bridge section having a lower end attachable to said top side of said first base member, and a second bridge section having a lower end attachable to said top side of said second base member, said first and second bridge sections each including a vertical portion extending upwardly from said respective lower ends, and a horizontal portion extending from said vertical portion and terminating at an upper end zone, adjustable extension means for selectively varying a distance between said first and second base members and being releasably attachable to said upper end zones of said first and second bridge sections, respectively, and extending horizontally therebetween, wherein said first and second bridge sections and said adjustable extension means define a bridge structure, securing means for removably securing said base members to the watercraft so that the bridge structure is supported above the mounting surface of the watercraft, said securing means including a pair of clamp members structured for attachment to said transom, and securing means on said rack for removably mounting said plurality of articles thereon, said securing means including said top side on each of said base members to facilitate support of at least one dive tank thereon and plate members fixedly attached to said vertically extending portions and including means thereon for holding light fixtures.

\* \* \* \* \*